United States Patent
Kamoi

(10) Patent No.: US 10,863,054 B2
(45) Date of Patent: Dec. 8, 2020

(54) IMAGE FORMING APPARATUS, IMAGE FORMING METHOD, AND NON-TRANSITORY COMPUTER READABLE MEDIUM

(71) Applicant: FUJI XEROX CO., LTD., Tokyo (JP)

(72) Inventor: Yusuke Kamoi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 101 days.

(21) Appl. No.: 15/441,404

(22) Filed: Feb. 24, 2017

(65) Prior Publication Data

US 2018/0084142 A1    Mar. 22, 2018

(30) Foreign Application Priority Data

Sep. 21, 2016    (JP) .................................. 2016-184056

(51) Int. Cl.
| | |
|---|---|
| *H04N 1/32* | (2006.01) |
| *H04N 1/00* | (2006.01) |
| *H04L 12/24* | (2006.01) |
| *H04L 12/26* | (2006.01) |

(52) U.S. Cl.
CPC ....... *H04N 1/32657* (2013.01); *H04L 41/026* (2013.01); *H04L 41/22* (2013.01); *H04L 43/08* (2013.01); *H04N 1/00* (2013.01); *H04N 1/00129* (2013.01); *H04N 1/00307* (2013.01); *H04N 1/00411* (2013.01); *H04N 1/32122* (2013.01); *H04N 1/32662* (2013.01); *H04N 2201/0081* (2013.01); *H04N 2201/0082* (2013.01); *H04N 2201/0093* (2013.01)

(58) Field of Classification Search
None
See application file for complete search history.

(56) References Cited

U.S. PATENT DOCUMENTS

| | | | |
|---|---|---|---|
| 2003/0043416 A1* | 3/2003 | Rublee | H04N 1/00222 358/402 |
| 2011/0199645 A1* | 8/2011 | Ito | H04N 1/00474 358/1.15 |

(Continued)

FOREIGN PATENT DOCUMENTS

| | | |
|---|---|---|
| JP | 2002-169683 A | 6/2002 |
| JP | 2013-94994 A | 5/2013 |
| JP | 2014-073632 A | 4/2014 |

OTHER PUBLICATIONS

Sep. 8, 2020 Office Action issued in Japanese Patent Application No. 2016-184056.

*Primary Examiner* — Mohammad H Ghayour
*Assistant Examiner* — Pawan Dhingra
(74) *Attorney, Agent, or Firm* — Oliff PLC

(57) ABSTRACT

An image forming apparatus includes a display, a communication unit, and a controller. Information is displayed on the display. The communication unit performs communication with a first display apparatus, which is an external apparatus. The controller performs control, if an error occurs during an image forming process, in such a manner that different error information is displayed on the display and on the first display apparatus on the basis of a communication status with the first display apparatus and statuses of operations performed by a user of the first display apparatus and a user of the image forming apparatus.

12 Claims, 10 Drawing Sheets

(56) References Cited

U.S. PATENT DOCUMENTS

| | | | | |
|---|---|---|---|---|
| 2013/0027737 A1* | 1/2013 | Suzuki | ............... | G03G 15/5079 |
| | | | | 358/1.14 |
| 2013/0155445 A1* | 6/2013 | Lee | ................... | H04N 1/32667 |
| | | | | 358/1.14 |
| 2014/0320874 A1* | 10/2014 | Tredoux | ................ | G06F 3/1244 |
| | | | | 358/1.13 |
| 2015/0036168 A1* | 2/2015 | Oguro | ................... | G06F 3/1294 |
| | | | | 358/1.14 |
| 2015/0134938 A1* | 5/2015 | Hosono | ............... | G06F 9/30145 |
| | | | | 712/225 |
| 2016/0182762 A1* | 6/2016 | Eum | .................... | H04L 63/105 |
| | | | | 358/1.14 |

\* cited by examiner

Failure/Error

Malfunction occurs inside the machine.

Please turn off the machine. Make sure the screen is black out, and then turn on it again.

If it still fails, contact the help desk.

XXX-
XXX

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-184056 filed Sep. 21, 2016.

BACKGROUND

Technical Field

The present invention relates to an image forming apparatus, an image forming method, and a non-transitory computer readable medium.

SUMMARY

According to an aspect of the invention, there is provided an image forming apparatus including a display, a communication unit, and a controller. Information is displayed on the display. The communication unit performs communication with a first display apparatus, which is an external apparatus. The controller performs control, if an error occurs during an image forming process, in such a manner that different error information is displayed on the display and on the first display apparatus on the basis of a communication status with the first display apparatus and statuses of operations performed by a user of the first display apparatus and a user of the image forming apparatus.

BRIEF DESCRIPTION OF THE DRAWINGS

Exemplary embodiments of the present invention will be described in detail based on the following figures, wherein.

DETAILED DESCRIPTION

Now, exemplary embodiments for implementing the present invention will be described below in detail with reference to the attached drawings.

First Exemplary Embodiment

Figure 1:
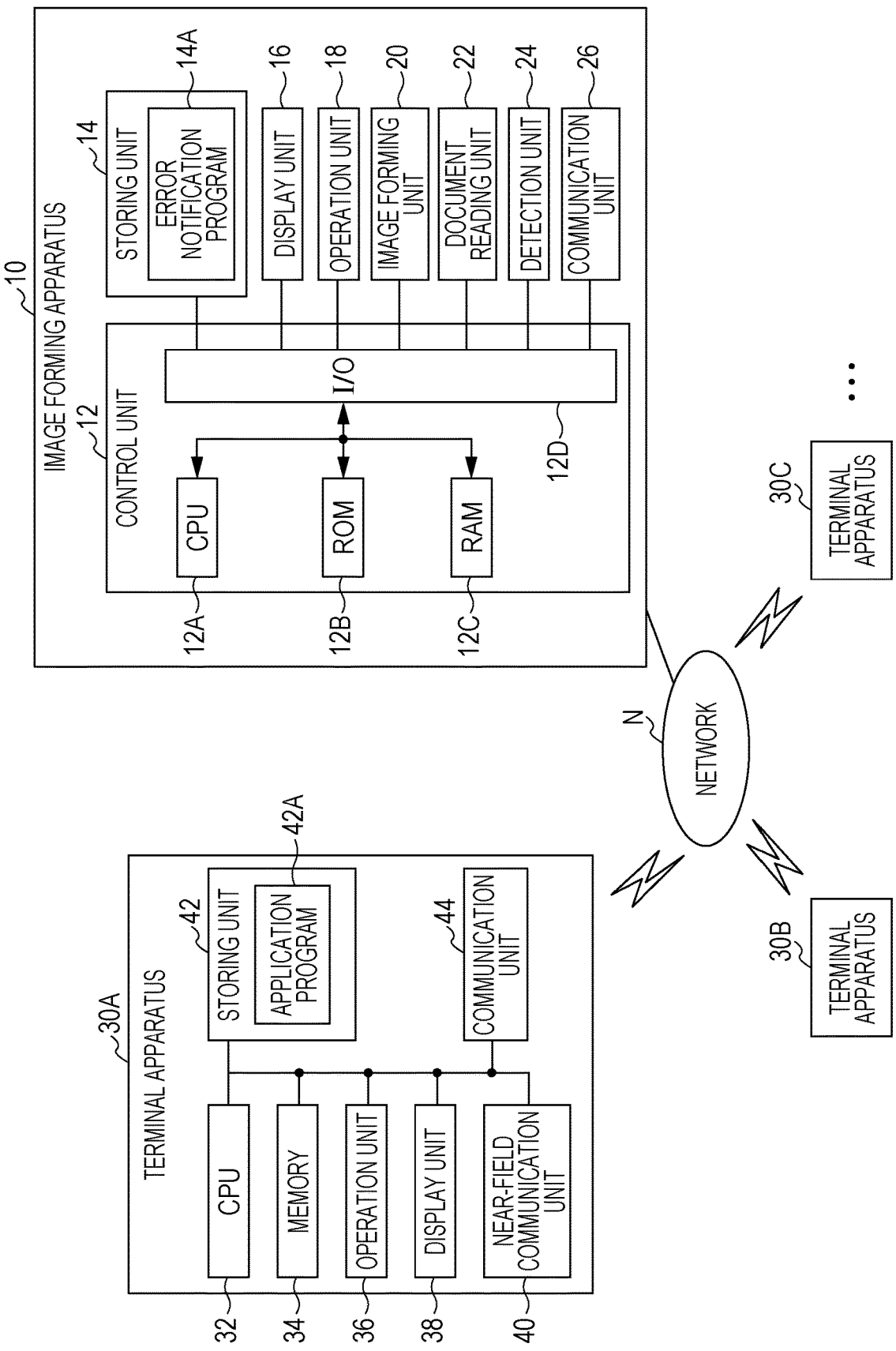
FIG. 1 is a block diagram illustrating an exemplary configuration of a network system including an image forming apparatus and a terminal apparatus according to exemplary embodiments.

FIG. 1 is a block diagram illustrating an exemplary configuration of a network system including an image forming apparatus 10 and a terminal apparatus 30A according to this exemplary embodiment.

As illustrated in FIG. 1, the image forming apparatus 10 includes a control unit 12, a storing unit 14, a display unit 16, an operation unit 18, an image forming unit 20, a document reading unit 22, a detection unit 24, and a communication unit 26.

The control unit 12 includes a central processing unit (CPU) 12A, a read only memory (ROM) 12B, a random access memory (RAM) 12C, and an input/output interface (I/O) 12D, which are connected to one another via a bus.

The I/O 12D is connected to each of function units including the storing unit 14, the display unit 16, the operation unit 18, the image forming unit 20, the document reading unit 22, the detection unit 24, and the communication unit 26. Each of these function units is capable of performing communication with the CPU 12A through the I/O 12D.

The control unit 12 may be formed as part of a main controlling unit that controls the entire operation of the image forming apparatus 10. For example, an integrated circuit such as a large scale integration (LSI) or an integrated circuit (IC) chip set is used for one or all of the blocks in the control unit 12. An individual circuit may be used for each of the above blocks, or an integrated circuit including one or all of the blocks may be used. All of the above blocks may be integrated, or one of the blocks may be separately provided. In each of the blocks, part of it may be separately provided. As an integrated circuit of the control unit 12, not only an LSI, but also a dedicated circuit or a general processor may be used.

Examples of the storing unit 14 include a hard disk drive (HDD), a solid state drive (SSD), a flash memory, and the like. The storing unit 14 stores an error notification program 14A. Note that the error notification program 14A may be stored in the ROM 12B.

The error notification program 14A may be, for example, installed in advance in the image forming apparatus 10. The error notification program 14A may be stored in a nonvolatile storage medium or may be distributed through a network to be installed as appropriate in the image forming apparatus 10. Note that examples of the nonvolatile storage medium include a compact-disc read only memory (CD-ROM), a magneto-optical disk, an HDD, a digital versatile disc (DVD)-ROM, a flash memory, a memory card, and the like.

Examples of the display unit 16 include a liquid crystal display (LCD), an organic electroluminescent (EL) display, and the like. A touchscreen is integrated in the display unit 16. The operation unit 18 is provided with various operation keys such as a numeric key pad and a start key. The display unit 16 and the operation unit 18 receive various instructions from a user of the image forming apparatus 10. Examples of the various instructions include an instruction for starting reading a document, an instruction for starting copying a document, and the like. Various types of information such as a result of a process performed in response to the instruction received from the user and a notification as a result of a process are displayed on the display unit 16.

The document reading unit 22 receives sheets of a document placed on the feeder tray of an automatic document feeder one by one and optically scans the received sheets, thereby obtaining image information. Alternatively, the document reading unit 22 optically scans a document placed on the document plate, such as a platen glass, thereby obtaining image information.

The image forming unit 20 forms an image on a recording medium such as paper on the basis of the image information obtained through scanning by the document reading unit 22 or image information obtained by, for example, an external personal computer (PC) connected through a network N. Although this exemplary embodiment describes an electrophotographic system as an example of a system for forming an image, another system such as an inkjet system may be employed.

If the system for forming an image is the electrophotographic system, the image forming unit 20 includes a photoconductor drum, a charging unit, an exposure unit, a development unit, a transfer unit, and a fixing unit. The charging unit applies a voltage to the photoconductor drum in order to cause the surface of the photoconductor drum to be charged. The exposure unit performs exposure on the photoconductor drum, which is charged by the charging unit, with light in accordance with image information, thereby forming an electrostatic latent image on the photoconductor drum. The development unit develops, with toner, the electrostatic latent image formed on the photoconductor drum, thereby forming a toner image on the photoconductor drum. The transfer unit transfers the toner image formed on the photoconductor drum onto a recording medium. The fixing unit fixes the toner image transferred on the recording medium by heating under pressure.

The detection unit 24 detects a person in the periphery of the image forming apparatus 10. For example, a camera, a motion detector, or the like is used as the detection unit 24.

The communication unit 26 is connected to the network N, which is a local area network (LAN), a wide area network (WAN), or the like, and performs communication with each of terminal apparatuses 30A, 30B, 30C, and the like through the network N. Although the communication unit 26 is connected to the network N with a wire in this example, the communication unit 26 may be connected wirelessly. The image forming apparatus 10 is session-connected to each of the terminal apparatuses 30A, 30B, 30C and the like through the communication unit 26. Note that the term "session" here means a unit for managing communication between two apparatuses from the start to the end. The term "session connection" means, for example, a function of layer 5 (session layer) or the like in the seven-layer open systems interconnection (OSI) model. Upon establishing the session connection between two apparatuses, information may be transferred by using an application program for communication.

On the other hand, the terminal apparatus 30A includes a CPU 32, a memory 34, an operation unit 36, a display unit 38, a near-field communication unit 40, a storing unit 42, and a communication unit 44. For example, a smartphone, a tablet terminal, a stationary PC, or the like is used as the terminal apparatus 30A. The terminal apparatus 30A is an example of a first display apparatus. Each of the terminal apparatuses 30B and 30C and the like has substantially the same configuration as the terminal apparatus 30A. The terminal apparatus 30B is an example of a second display apparatus. In this example, each of the terminal apparatuses 30A and 30B is a terminal apparatus used by an average user of the image forming apparatus 10. The terminal apparatus 30C is a terminal apparatus used by a system manager who manages the image forming apparatus 10 or a person who is in charge of the system (hereinafter referred to as a system manager or the like). Although the first exemplary embodiment describes the terminal apparatuses 30A, 30B, 30C and the like as examples, the terminal apparatuses are not limited to the terminal apparatuses 30A, 30B, 30C and the like.

The operation unit 36 is provided with a power button, various operation buttons, and the like. Examples of the display unit 38 include a liquid crystal display (LCD), an organic EL display, and the like. A touchscreen is integrated in the display unit 38.

The near-field communication unit 40 performs communication with another terminal apparatus within a relatively small distance. The wireless system used for the near-field communication unit 40 is, for example, Bluetooth (registered trademark).

The communication unit 44 is connected to the network N and performs communication with the image forming apparatus 10 through the network N. In this example, the communication unit 44 is connected to the network N wirelessly. The communication unit 44 of the terminal apparatus 30A and the communication unit 26 of the image forming apparatus 10 are session-connected by using an application program 42A.

The storing unit 42 stores the application program 42A used for a session connection with the image forming apparatus 10 and for remote control of the image forming apparatus 10. Note that the application program 42A may alternatively be stored in the memory 34.

The application program 42A may be, for example, installed in advance in the terminal apparatus 30A. The application program 42A may be stored in a nonvolatile storage medium or may be distributed through a network to be installed as appropriate in the terminal apparatus 30A. Note that examples of the nonvolatile storage medium include a CD-ROM, a magneto-optical disk, an HDD, a DVD-ROM, a flash memory, a memory card, and the like.

In accordance with a user operation, the CPU 32 reads the application program 42A stored in the storing unit 42 and executes the application program 42A, thereby causing an operation screen for remote control of the image forming apparatus 10 to be displayed on the display unit 38. It is possible for a user of the terminal apparatus 30A to operate an operation screen displayed on the display unit 38, thereby instructing the image forming apparatus 10 to perform an image forming process.

Figure 2:
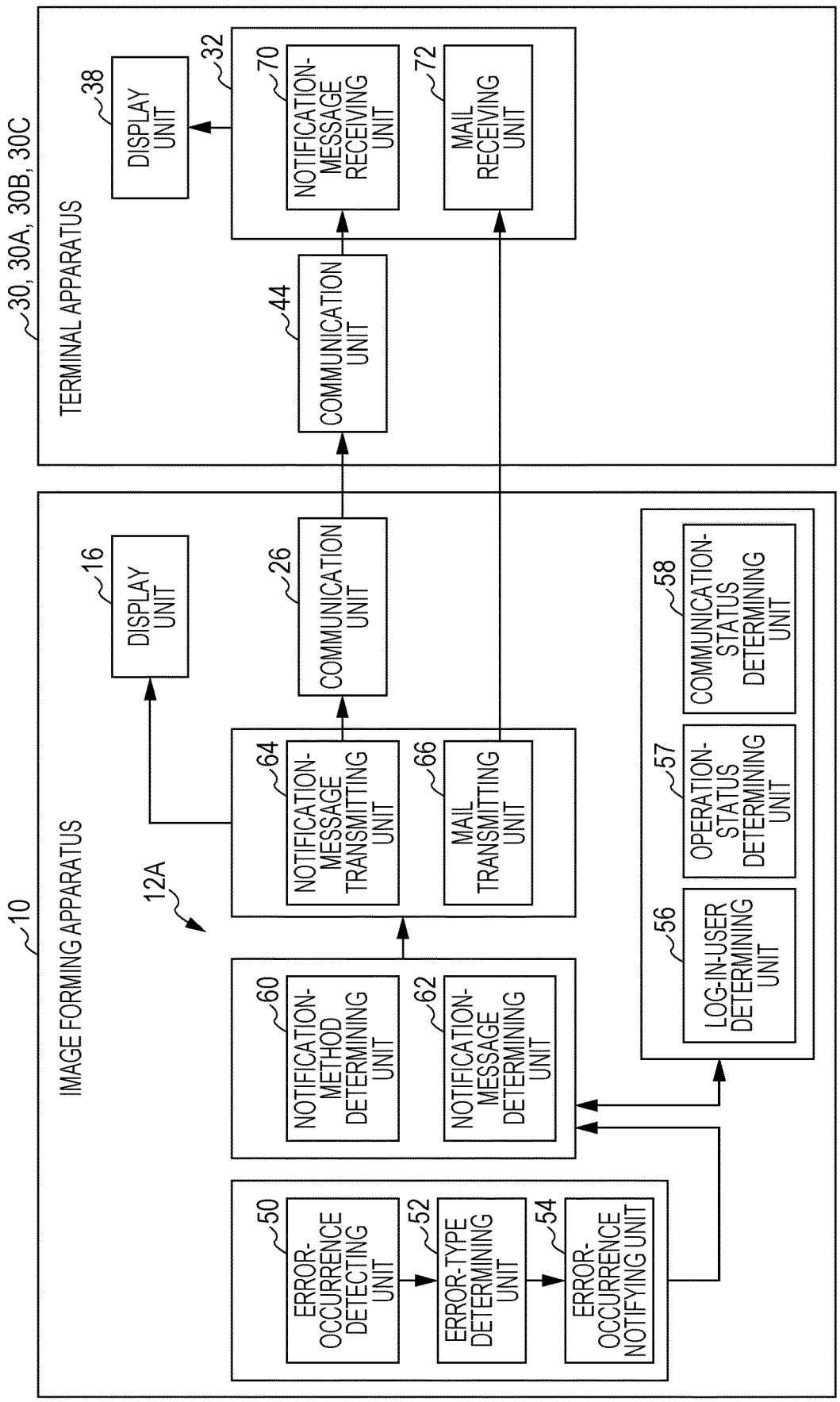
FIG. 2 is a block diagram illustrating functional configuration examples of a central processing unit (CPU) included in the image forming apparatus according to the exemplary embodiments and a CPU included in the terminal apparatus according to the exemplary embodiments.

FIG. 2 is a block diagram illustrating functional configuration examples of the CPU 12A included in the image forming apparatus 10 according to this exemplary embodiment and the CPU 32 included in a terminal apparatus 30 according to this exemplary embodiment. Note that the terminal apparatus 30 is representative of the terminal apparatuses 30A, 30B, 30C and the like.

As illustrated in FIG. 2, the CPU 12A included in the image forming apparatus 10 according to this exemplary embodiment functions as an error-occurrence detecting unit 50, an error-type determining unit 52, and an error-occurrence notifying unit 54. The CPU 12A further functions as a log-in-user determining unit 56, an operation-status determining unit 57, and a communication-status determining unit 58. The CPU 12A further functions as a notification-method determining unit 60 and a notification-message determining unit 62. The CPU 12A further functions as a notification-message transmitting unit 64 and a mail transmitting unit 66. The CPU 12A writes the error notification program 14A, which is stored in the storing unit 14, in the RAM 12C and executes the error notification program 14A, and thereby functions as each of the above units.

The error-occurrence detecting unit 50 detects an error that occurs during an image forming process in the image forming apparatus 10. Examples of the error include a typical error that may be corrected even by an average user and a system error that may be corrected only by the system manager or the like. Note that examples of the typical error include a paper jam, paper out, toner out, and the like. In this exemplary embodiment, if an operation for image formation is stopped in the image forming apparatus 10, this phenomenon is detected as the occurrence of an error.

The error-type determining unit 52 determines whether the error detected by the error-occurrence detecting unit 50 is a typical error or a system error. If the error is a typical error, the error-type determining unit 52 further determines the content of the error (e.g., a paper jam, paper out, or toner out).

The error-occurrence notifying unit 54 notifies each of the notification-method determining unit 60 and the notification-message determining unit 62 of the result of determination by the error-type determining unit 52.

On the other hand, the log-in-user determining unit 56 determines whether or not log-in of the user of the image forming apparatus 10 is allowed. The log-in-user determining unit 56 receives input of user identification (ID) information by, for example, reading a user's ID card and determines whether or not the received ID information is registered. If the ID information is registered, the log-in-user determining unit 56 allows the log-in of the user.

The operation-status determining unit 57 determines statuses of operations performed by users of the image forming apparatus 10 and each terminal apparatus 30. As the determination of the operation status of the image forming apparatus 10, for example, it is determined whether or not an instruction for performing an image forming process has been issued from the operation unit 18 of the image forming apparatus 10. In addition, as the determination of the operation status of the terminal apparatus 30, for example, it is determined whether or not an instruction for performing an image forming process has been issued through the operation screen of the terminal apparatus 30. In this exemplary embodiment, an individual uniform resource locator (URL) is assigned to each operation screen of the terminal apparatus 30. On the basis of the URL specified in the terminal apparatus 30, the operation-status determining unit 57 determines whether or not the operation screen that is being displayed on the terminal apparatus 30 is relevant to the image forming process. That is, which operation screen (e.g., copy screen, print screen, scan screen, or facsimile screen) is being displayed on the terminal apparatus 30 may be determined from the URL of the operation screen. That is, the operation-status determining unit 57 may determine the apparatus from which the instruction for performing the image forming process has been issued so that, for example, different error information may be displayed on the display unit 16 and on the terminal apparatus 30 in accordance with the determination result, as will be described later.

The communication-status determining unit 58 determines a communication status between the image forming apparatus 10 and the terminal apparatus 30. As the determination of the communication status with the terminal apparatus 30, for example, it is determined whether a session connection is established between the image forming apparatus 10 and the terminal apparatus 30.

Each of the notification-method determining unit 60 and the notification-message determining unit 62 is notified of the results of determination by the log-in-user determining unit 56, the operation-status determining unit 57, and the communication-status determining unit 58.

Upon receiving an error notification from the error-occurrence notifying unit 54, on the basis of the results of determination by the log-in-user determining unit 56, the operation-status determining unit 57, and the communication-status determining unit 58, the notification-method determining unit 60 determines an error message notification method. The notification-message determining unit 62 determines the content of the error message. Note that the error message is an example of the error information. In this exemplary embodiment, the storing unit 14 stores multiple error messages that are determined in advance in accordance with the content of the error. Examples of the error message notification method include displaying the error message on the display unit 16, transmitting the error message to the terminal apparatus 30 through the communication unit 26, transmitting the error message to the terminal apparatus 30 by email, and the like. The notification-method determining unit 60 further determines whether the error message is to be displayed on the entire screen or to be displayed as a banner, for example. Specific examples of the notification method and the error message will be described later.

If the notification method determined by the notification-method determining unit 60 is a method using the communication unit 26, the notification-message transmitting unit 64 transmits the error message determined by the notification-message determining unit 62 to the terminal apparatus 30 through the communication unit 26. If the notification method determined by the notification-method determining unit 60 is a method using the display unit 16, the notification-message transmitting unit 64 transmits the error message determined by the notification-message determining unit 62 to the display unit 16 so that the error message is displayed on the display unit 16. If the notification method determined by the notification-method determining unit 60 is a method using email, the mail transmitting unit 66 transmits the error message determined by the notification-message determining unit 62 to the terminal apparatus 30 by email.

On the other hand, the CPU 32 included in the terminal apparatus 30 according to this exemplary embodiment functions as a notification-message receiving unit 70 and a mail receiving unit 72. The notification-message receiving unit 70 receives the error message transmitted from the communication unit 26 of the image forming apparatus 10 through the communication unit 44. The error message received by the notification-message receiving unit 70 is displayed on the display unit 38. In addition, the mail receiving unit 72 receives the email transmitted from the mail transmitting unit 66 of the image forming apparatus 10. The error massage included in the email received by the mail receiving unit 72 is displayed on the display unit 38 in accordance with a user operation.

In an image forming apparatus of the related art, if operations may also be performed from an external terminal apparatus through a network and an error occurs during an image forming process, error information may also be displayed on the external terminal apparatus in some cases. In this case, however, the same error information is displayed on a display unit included in the image forming apparatus and the external terminal apparatus, and accordingly, inappropriate error information for each user may be displayed.

In contrast, the image forming apparatus 10 according to the first exemplary embodiment includes the control unit 12 that performs the following process. That is, if an error occurs during an image forming process, the control unit 12 according to this exemplary embodiment performs control in such a manner that an error information item is displayed on the display unit 16 and performs control in such a manner that another error information item is transmitted to the terminal apparatus 30 through the communication unit 26 so that the other error information is displayed on the terminal apparatus 30, the error information items being different from each other. This control is performed on the basis of the communication status with the terminal apparatus 30 and the statuses of operations performed by the users of the terminal apparatus 30 and the image forming apparatus 10. This function of the control unit 12 is realized by the CPU 12A writing the error notification program 14A, which is stored in the storing unit 14, in the RAM 12C and executing the error notification program 14A.

For example, the different error information items include first error information that indicates the occurrence of an error and second error information that encourages correction of the error. If, on the basis of the above operation statuses, it is determined that an instruction for performing an image forming process during which an error has occurred has been issued from the terminal apparatus 30, the control unit 12 performs control in such a manner that the second error information is transmitted to the terminal apparatus 30 through the communication unit 26 to be displayed on the terminal apparatus 30. In this case, the first error information is displayed on the image forming apparatus 10 from which the instruction for performing the image forming process has not been issued. If, on the basis of the above operation statuses, it is determined that an instruction for performing an image forming process during which an error has occurred has been issued from the image forming apparatus 10, the control unit 12 performs control in such a manner that the second error information is displayed on the display unit 16. In this case, the first error information is displayed on the terminal apparatus 30 from which the instruction for performing the image forming process has not been issued.

According to the first exemplary embodiment, if an error occurs during an image forming process, appropriate error information in accordance with each of the users of the image forming apparatus 10 and the terminal apparatus 30 is displayed.

Now, an operation of the image forming apparatus 10 according to the first exemplary embodiment will be described with reference to FIG. 3. Note that FIG. 3 is a flowchart illustrating an exemplary process of the error notification program 14A according to the first exemplary embodiment.

Upon receiving an instruction for performing an image forming process with respect to the image forming apparatus 10, independently of the image forming process, the CPU 12A writes the error notification program 14A, which is stored in the storing unit 14, in the RAM 12C and executes the error notification program 14A, and thereby functions as each of the units illustrated in FIG. 2. Note that the units here include the error-occurrence detecting unit 50, the error-type determining unit 52, the error-occurrence notifying unit 54, the log-in-user determining unit 56, the operation-status determining unit 57, and the communication-status determining unit 58. The units here further include the notification-method determining unit 60, the notification-message determining unit 62, the notification-message transmitting unit 64, and the mail transmitting unit 66.

Figure 3:
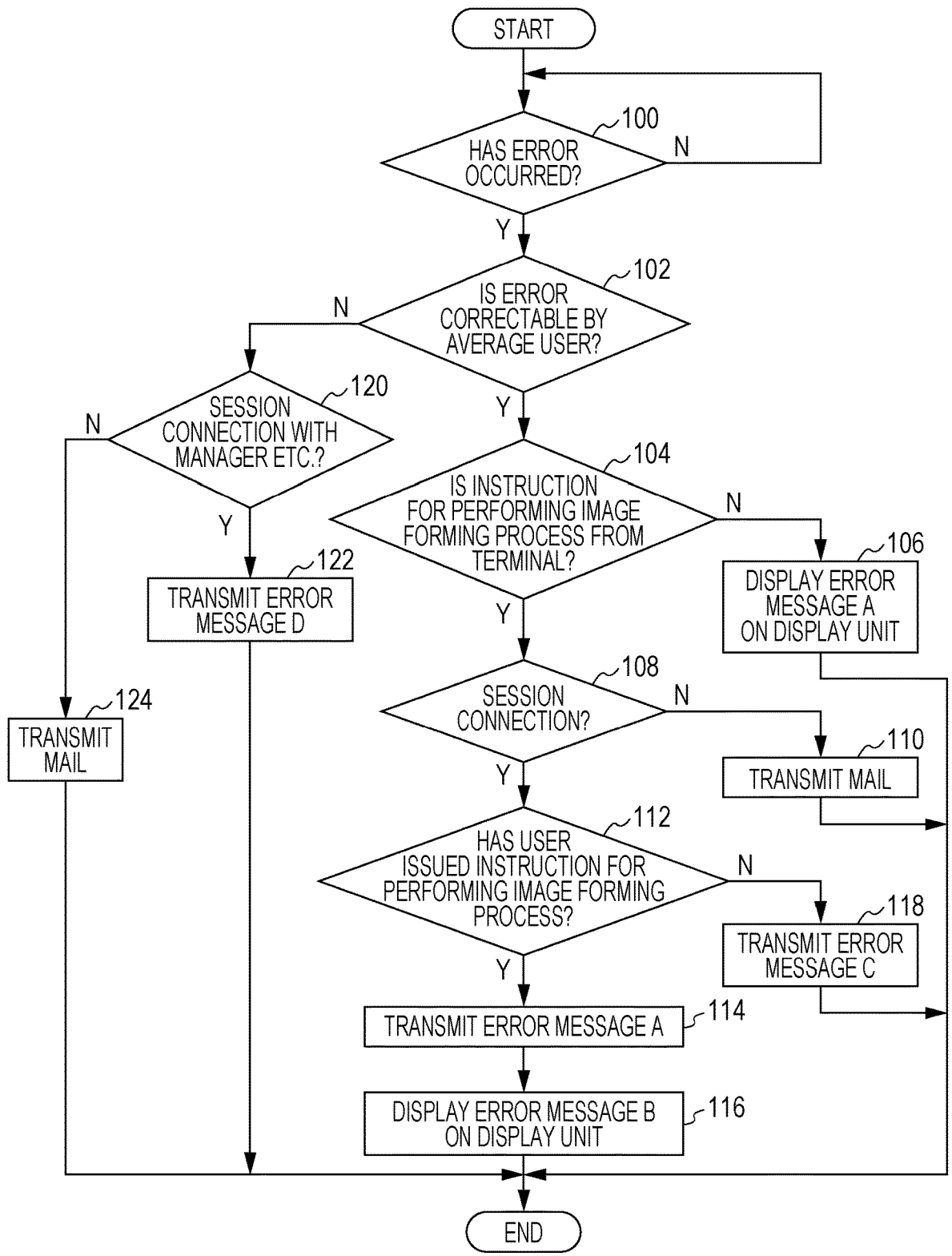
FIG. 3 is a flowchart illustrating an exemplary process of an error notification program according to a first exemplary embodiment.

First, in step S100 in FIG. 3, it is determined that the error-occurrence detecting unit 50 has detected the occurrence of an error during the image forming process performed by the image forming apparatus 10. If the occurrence of the error has been detected (determination is YES), the process proceeds to step S102; if the occurrence of the error has not been detected (determination is NO), the image forming apparatus 10 stands by in step S100.

In step S102, the error-type determining unit 52 determines whether or not the error that has occurred is correctable by an average user. If it is determined that the error is correctable by an average user (determination is YES), the process proceeds to step S104. On the other hand, if it is determined that the error is not correctable by an average user (determination is NO), the process proceeds to step S120.

In step S104, the operation-status determining unit 57 determines whether or not the instruction for performing the image forming process has been issued from the terminal apparatus 30. If it is determined that the instruction for performing the image forming process is not from the terminal apparatus 30, that is, if it is determined that the instruction for performing the image forming process is from the image forming apparatus 10 (determination is NO), the process proceeds to step S106. On the other hand, if it is determined that the instruction for performing the image forming process is from the terminal apparatus 30 (determination is YES), the process proceeds to step S108. Note that in this case, a user who has issued the instruction for performing the image forming process through the image forming apparatus 10 is a user who is allowed to log in by the log-in-user determining unit 56.

In step S106, as a method for notifying the user who uses the image forming apparatus 10, the notification-method determining unit 60 selects a method for displaying an error message on the display unit 16. In this case, the notification-message determining unit 62 selects, for example, an error message A illustrated in FIG. 4 as the content of the error message. Note that data of the error message A is stored in advance in the storing unit 14. Then, the notification-message transmitting unit 64 transmits the error message A selected in the above manner to the display unit 16 so that the error message A is displayed on the display unit 16, and the process ends. That is, if the instruction for performing the image forming process has been issued from the image forming apparatus 10 and an error occurs, it is desirable that the error message A be displayed so as to encourage the user to correct the error. Note that the error message A is an example of the second error information that encourages correction of the error.

Figure 4:
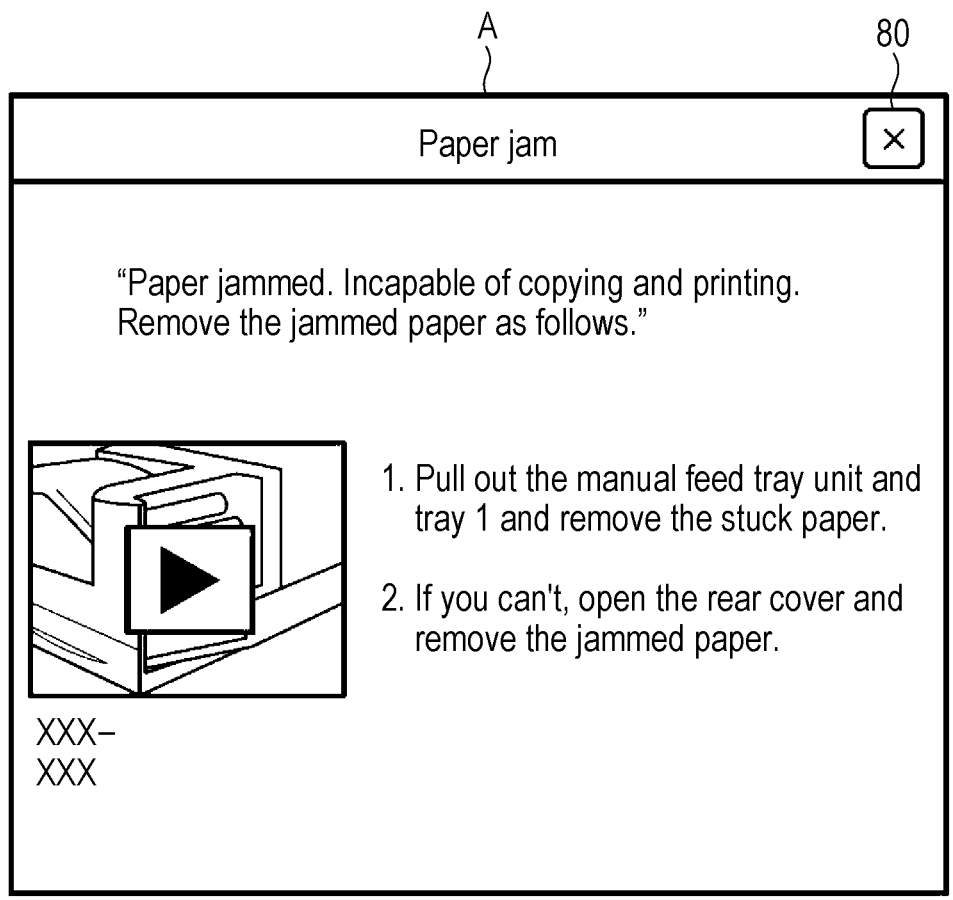
FIG. 4 illustrates an example of an error message screen according to the exemplary embodiments.

FIG. 4 illustrates an example of an error message screen according to this exemplary embodiment.

As illustrated in FIG. 4, the error message A is a message displayed on the entire screen or part of the screen of the display unit 16 included in the image forming apparatus 10 if a "paper jam" has occurred. Since the user of the image forming apparatus 10 is the user who has issued the instruction for performing the image forming process, the error message A has such a content that encourages correction of the error.

Referring back to FIG. 3, on the other hand, in step S108, the communication-status determining unit 58 determines whether or not a session connection is established between the image forming apparatus 10 and the terminal apparatus 30. If it is determined that the session connection is not established between the image forming apparatus 10 and the terminal apparatus 30 (determination is NO), the process proceeds to step S110. On the other hand, if it is determined that the session connection is established between the image forming apparatus 10 and the terminal apparatus 30 (determination is YES), the process proceeds to step S112.

In step S110, the mail transmitting unit 66 transmits an email as a notification of the occurrence of the error to the terminal apparatus 30 (here, the terminal apparatus 30A) from which the instruction for performing the image forming process has been issued, and the process ends. Note that the email may have such a content that encourages correction of the error. If the session connection with the terminal apparatus 30A is not established, it is desirable that the notification of the error be transmitted by email. Then, at the time the session connection with the terminal apparatus 30A is established, the error message A may be transmitted to the terminal apparatus 30A on a priority basis.

On the other hand, in step S112, the operation-status determining unit 57 determines whether or not the session-connected terminal apparatus 30 is the terminal apparatus 30A from which the instruction for performing the image forming process has been issued. If it is determined that the session-connected terminal apparatus 30 is the terminal apparatus 30A from which the instruction for performing the image forming process has been issued (determination is YES), the process proceeds to step S114. On the other hand, if it is determined that the session-connected terminal apparatus 30 is not the terminal apparatus 30A from which the instruction for performing the image forming process has been issued, that is, if it is determined that the session-connected terminal apparatus 30 is the terminal apparatus 30B (determination is NO), the process proceeds to step S118.

In step S114, as a method for notifying the user of the session-connected terminal apparatus 30A from which the instruction for performing the image forming process has been issued, the notification-method determining unit 60 selects a method for transmitting an error message through the communication unit 26. In this case, the notification-message determining unit 62 selects, for example, the error message A illustrated in FIG. 4 as the content of the error message. Then, the notification-message transmitting unit 64 transmits the error message A selected in the above manner to the terminal apparatus 30A through the communication unit 26 so that the error message A is displayed on the terminal apparatus 30A.

As illustrated in FIG. 4, the error message A is displayed on, for example, the entire screen of the display unit 38 included in the terminal apparatus 30A. Since the user of the terminal apparatus 30A is the user who has issued the instruction for performing the image forming process, the error message A has such a content that encourages correction of the error. Note that a close button (x) 80 is displayed together with the error message A on the screen of the display unit 38. In response to the user pushing the close button 80, the error message A is hidden from being displayed.

Then, in step S116, as a method for notifying the user who uses the image forming apparatus 10, the notification-method determining unit 60 selects a method for displaying an error message on the display unit 16. In this case, the notification-message determining unit 62 selects, for example, an error message B illustrated in FIG. 5 as the content of the error message. Note that data of the error message B is stored in advance in the storing unit 14. The error message B is a different message from the error message A. Then, the notification-message transmitting unit 64 transmits the error message B selected in the above manner to the display unit 16 so that the error message B is displayed on the display unit 16, and the process ends. Note that the error message B is an example of the first error information that indicates the occurrence of the error.

Figure 5:
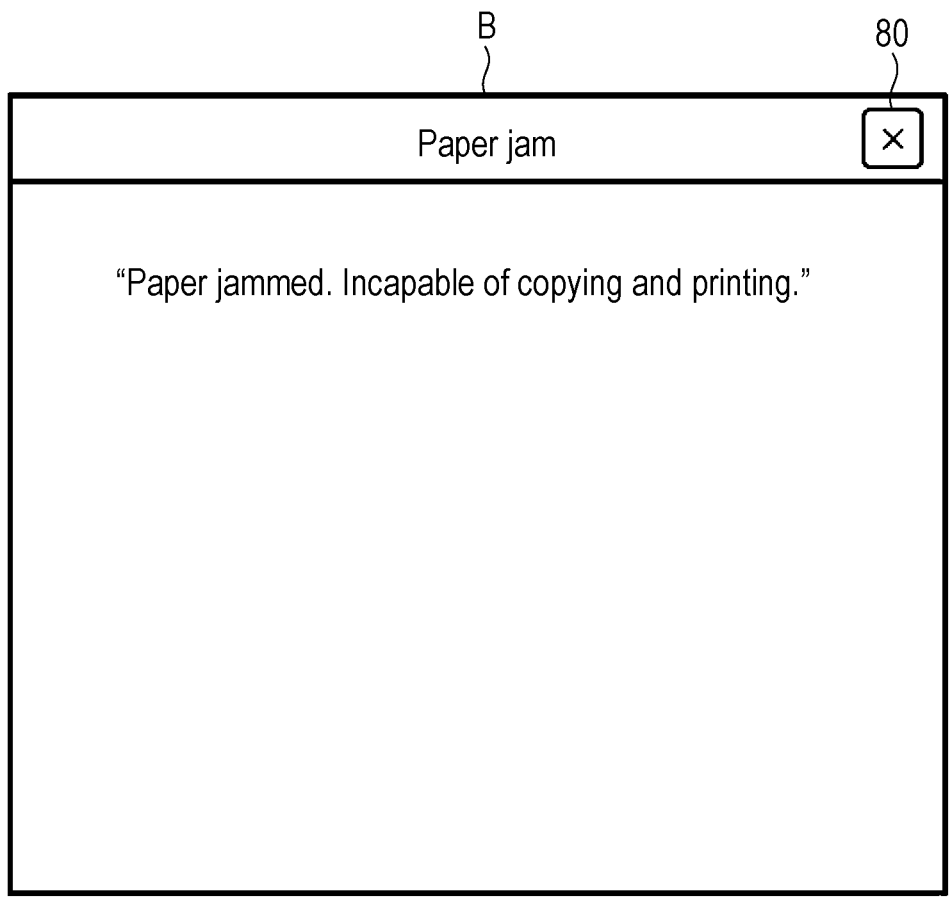
FIG. 5 illustrates another example of the error message screen according to the exemplary embodiments.

FIG. 5 illustrates another example of the error message screen according to this exemplary embodiment.

As illustrated in FIG. 5, the error message B is displayed on the entire screen or part of the screen of the display unit 16 included in the image forming apparatus 10. In this case, since the user of the image forming apparatus 10 is not the user who has issued the instruction for performing the image forming process, the error message B has such a content that indicates the occurrence of the error.

Referring back to FIG. 3, in step S116, if the detection unit 24 has detected a person in the periphery of the image forming apparatus 10, the notification-message transmitting unit 64 may transmit the error message B to the display unit 16 so that the error message B is displayed on the display unit 16. That is, if there is a person in the periphery of the image forming apparatus 10, the error message B is displayed on the display unit 16; if there is no person in the periphery of the image forming apparatus 10, the error message B is not displayed on the display unit 16. The display control in this manner prevents unnecessary displaying of the error. Note that the term "person" here is not limited to the user of the image forming apparatus 10 and includes a passing stranger.

On the other hand, in step S118, as a method for notifying the user of the session-connected terminal apparatus 30B from which the instruction for performing the image forming process has not been issued, the notification-method determining unit 60 selects a method for transmitting an error message through the communication unit 26. In this case, the notification-message determining unit 62 selects, for example, an error message C illustrated in FIG. 6 as the content of the error message. Note that data of the error message C is stored in advance in the storing unit 14. The error message C is a different message from the error message A. Then, the notification-message transmitting unit 64 transmits the error message C selected in the above manner to the terminal apparatus 30B through the communication unit 26 so that the error message C is displayed on the terminal apparatus 30B, and the process ends. Note that the error message C is banner information that indicates the occurrence of the error and is an example of third error information.

Figure 6:
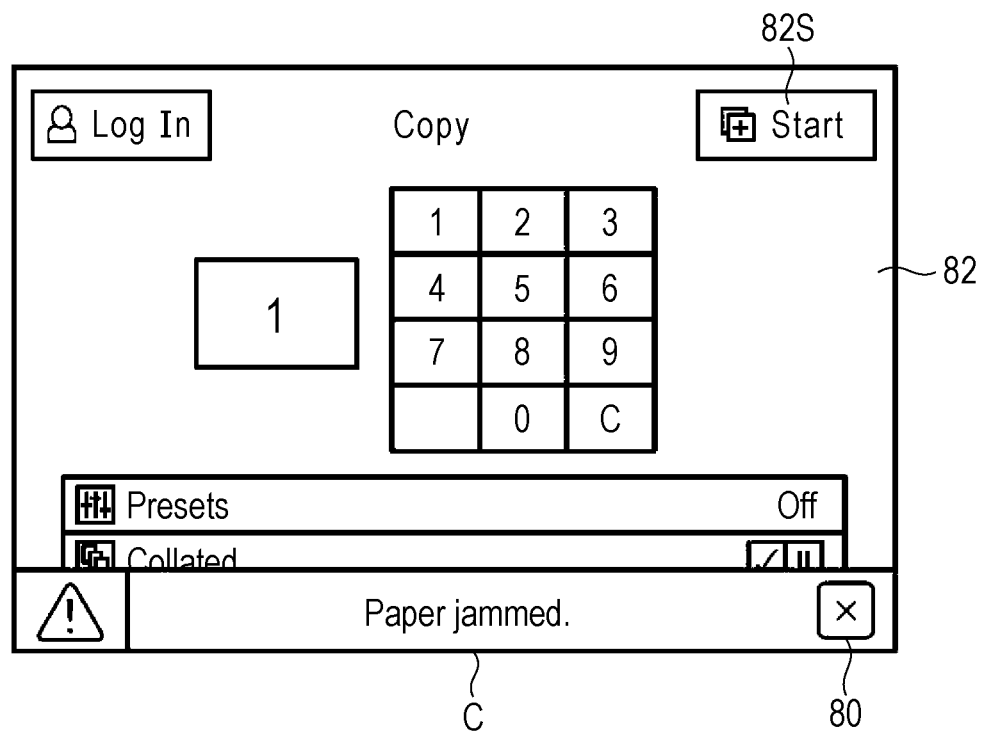
FIG. 6 illustrates still another example of the error message screen according to the exemplary embodiments.

FIG. 6 illustrates still another example of the error message screen according to this exemplary embodiment.

As illustrated in FIG. 6, the error message C is displayed as a banner on part of the screen of the display unit 38 included in the terminal apparatus 30B. In this case, since the user of the terminal apparatus 30B is not the user who has issued the instruction for performing the image forming process, the error message C is displayed as a banner. Accordingly, the user is notified of the occurrence of the error like a flash report.

Note that in this example, the error message C is displayed as a banner superposed on part of a copy screen 82. If an operation for issuing an instruction for performing an image forming process is performed on the terminal apparatus 30B in the state where the error message C is displayed as a banner on the terminal apparatus 30B, the notification-message transmitting unit 64 may transmit the error message A to the terminal apparatus 30B through the communication unit 26 so that the error message A is displayed on the terminal apparatus 30B. The display control in this manner prevents the user from performing an unnecessary operation. Note that the operation for issuing an instruction for performing an image forming process is, for example, a pushing operation of a start button 82S or the like.

In addition, if an operation screen that is irrelevant to the image forming process is displayed on the terminal apparatus 30B, the notification-message transmitting unit 64 may cancel the transmission of the error message C to the terminal apparatus 30B. The cancellation of the transmission prevents a user operation from being interrupted by the displaying of the error message C.

In addition, during displaying of the error message A on the terminal apparatus 30A, if the error message A is hidden from being displayed, the notification-message transmitting unit 64 may transmit the error message A to the terminal apparatus 30B through the communication unit 26 so that the error message A is displayed on the terminal apparatus 30B. The display control in this manner prevents the error from being left. Note that the hiding of the error message A that has been displayed on the terminal apparatus 30A may be determined by detecting a pushing operation of the close button 80 performed by the user.

Referring back to FIG. 3, on the other hand, in step S120, the communication-status determining unit 58 determines whether or not a session connection is established between the image forming apparatus 10 and the terminal apparatus 30 (here, the terminal apparatus 30C) of the system manager or the like. If it is determined that the session connection is established between the image forming apparatus 10 and the terminal apparatus 30C (determination is YES), the process proceeds to step S122. On the other hand, if it is determined that the session connection is not established between the image forming apparatus 10 and the terminal apparatus 30C (determination is NO), the process proceeds to step S124.

In step S122, as a method for notifying the system manager or the like who uses the session-connected terminal apparatus 30C, the notification-method determining unit 60 selects a method for transmitting an error message through the communication unit 26. In this case, the notification-message determining unit 62 selects, for example, an error message D illustrated in FIG. 7 as the content of the error message. Then, the notification-message transmitting unit 64 transmits the error message D selected in the above manner to the terminal apparatus 30C through the communication unit 26 so that the error message D is displayed on the terminal apparatus 30C, and the process ends. Note that the error message D is an example of an error message that only the system manager or the like is notified of.

Figure 7:
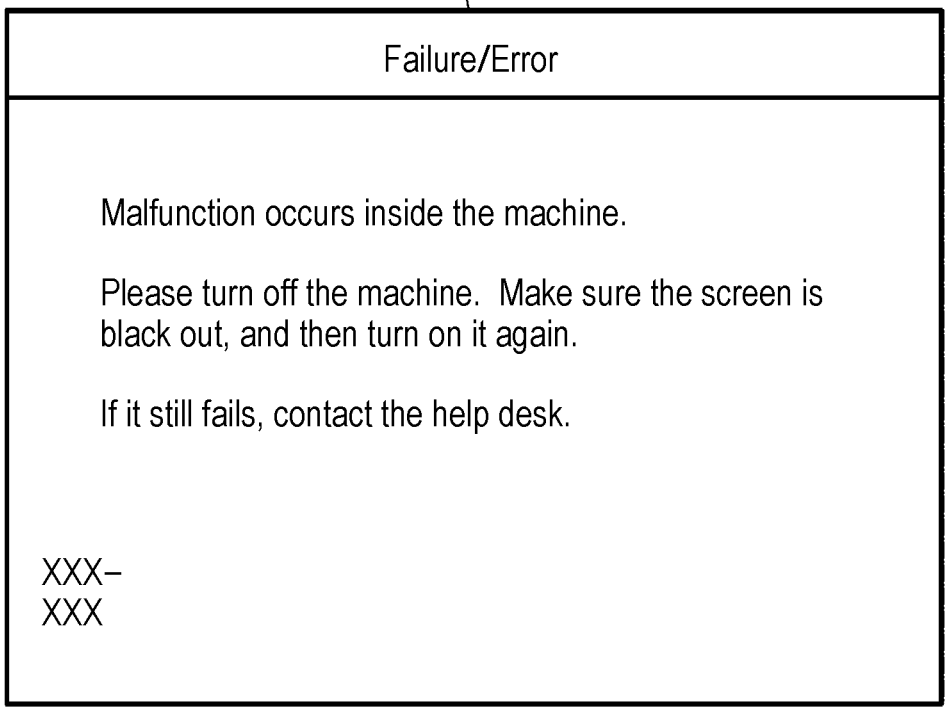
FIG. 7 illustrates yet another example of the error message screen according to the exemplary embodiments.

FIG. 7 illustrates yet another example of the error message screen according to this exemplary embodiment.

As illustrated in FIG. 7, the error message D is displayed on the entire screen or part of the screen of the display unit 38 included in the terminal apparatus 30C. If a system error that is not correctable by an average user occurs, the system manager or the like is notified of the error message D. Accordingly, the system error is appropriately handled too.

Referring back to FIG. 3, on the other hand, in step S124, the mail transmitting unit 66 transmits an email as a notification of the occurrence of the error to the terminal apparatus 30C of the system manager or the like, and the process ends. If the session connection with the terminal apparatus 30C is not established, it is desirable that the notification of the error be transmitted by email.

Note that, if there is no user who is to correct the error, it is desirable that the error message A be displayed on at least one of the multiple terminal apparatuses 30 that are session-connected. A desirable order of priority for displaying the error message A is, for example, as follows: a terminal apparatus of a user who has issued an instruction for performing an image forming process, a terminal apparatus of a user who has issued an instruction for performing an image forming process and is waiting for the process, a terminal apparatus of a user who is looking at a screen relevant to an error, and a terminal apparatus of a user who is looking at a screen irrelevant to an error.

In addition, if there is no user who is to correct the error, it is possible to specify the latest user by using a job history. If a session connection is established with the terminal apparatus 30 of the latest user, the error message A is displayed on the terminal apparatus 30 in order to encourage correction of the error. If the error is not corrected even in this case, the error message A may be displayed on the terminal apparatus 30 of the user before the latest user.

Upon correction of the error, the displaying of the error message may be cancelled, and a message indicating that the error is corrected may be displayed on the terminal apparatus 30 of the user to whom the error message has been displayed.

In the above description, a case where the error of a "paper jam" occurs has been described as an example. If it is necessary to replace consumables in order to correct the error, the error message illustrated in FIG. 8 may be transmitted to be displayed. Note that examples of the consumables include paper, toner, and the like.

Figure 8:
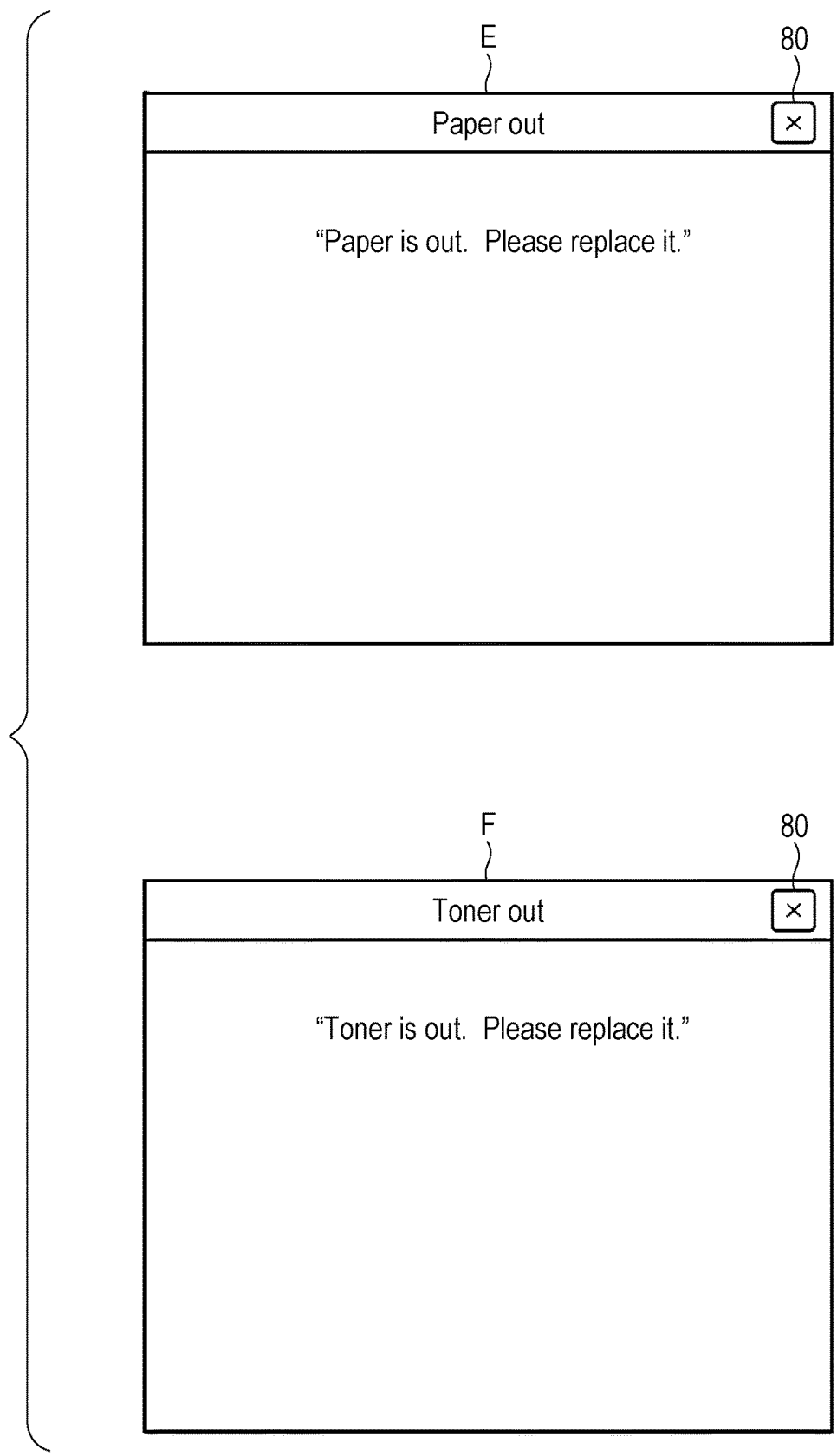
FIG. 8 illustrates other examples of the error message screen according to the exemplary embodiments.

FIG. 8 illustrates other examples of the error message screen according to this exemplary embodiment.

As illustrated in the upper part of FIG. 8, an error message E is a message displayed if an error of "paper out" occurs. The error message E is displayed, for example, on the entire screen of the display unit 38 included in the terminal apparatus 30A. Since the user of the terminal apparatus 30A is the user who has issued the instruction for performing the image forming process, the error message E has such a content that encourages replacement of paper. On the other hand, as illustrated in the lower part of FIG. 8, an error message F is a message displayed if an error of "toner out" occurs. The error message F is displayed, for example, on the entire screen of the display unit 38 included in the terminal apparatus 30A. Since the user of the terminal apparatus 30A is the user who has issued the instruction for performing the image forming process, the error message F has such a content that encourages replacement of a toner.

Figure 9:
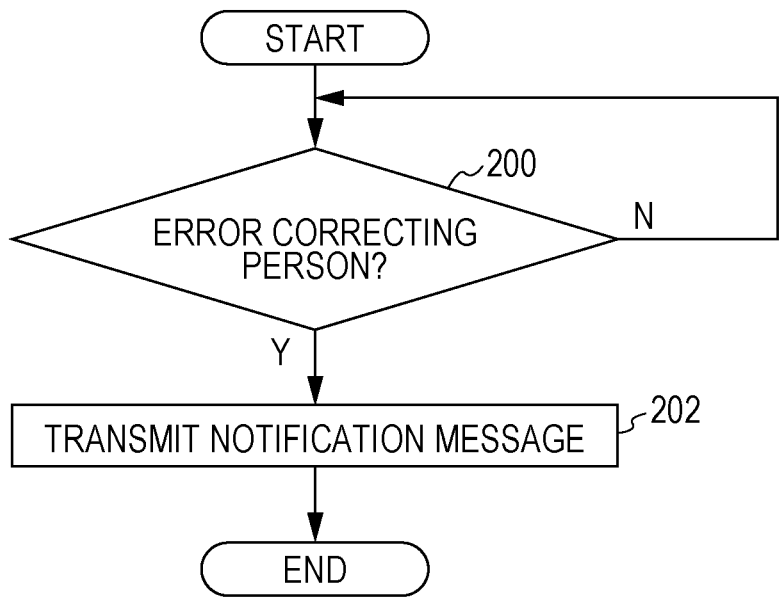
FIG. 9 is a flowchart illustrating an exemplary process of an interruption process program according to the first exemplary embodiment.

FIG. 9 is a flowchart illustrating an exemplary process of an interruption process program according to the first exemplary embodiment. This process is performed as an interruption of the flowchart illustrated in FIG. 3. Note that although the interruption process program is omitted from the illustration, the interruption process program is stored in advance in the storing unit 14.

First, in step S200 in FIG. 9, the operation-status determining unit 57 determines whether or not the detection unit 24 has detected a person (error correcting person) who is correcting an error. If the error correcting person has been detected (determination is YES), the process proceeds to step S202; if the error correcting person has not been detected (determination is NO), the image forming apparatus 10 stands by in step S200. Note that the term "error correcting person" here means not only the user of the image forming apparatus 10 but also a person who is performing an operation for correcting the error. The error correcting person is detected by using, for example, a camera, a motion detector, or the like. It may be determined that there is an error correcting person if the door of the image forming apparatus 10 is open after the error has occurred.

Figure 10:
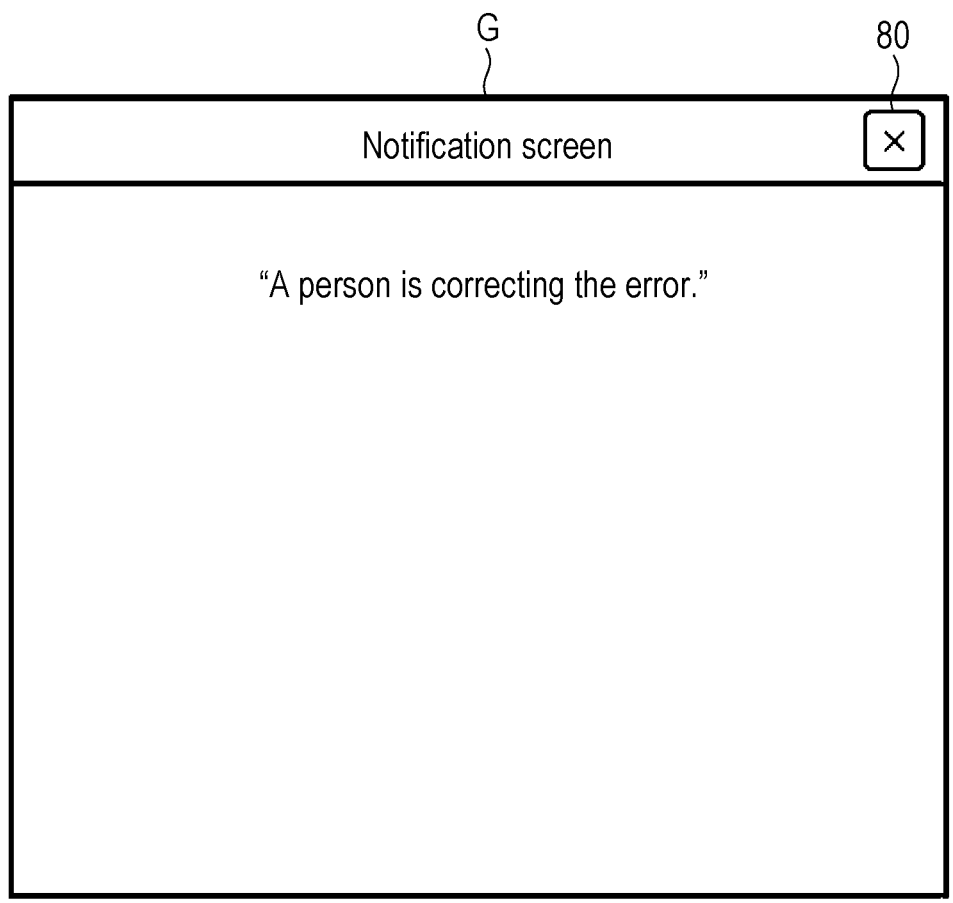
FIG. 10 illustrates an example of a notification message screen according to the exemplary embodiments.

In step S202, the notification-message transmitting unit 64 transmits a notification message G illustrated in FIG. 10 to the terminal apparatus 30A through the communication unit 26 so that the notification message G is displayed on the terminal apparatus 30A. The notification message G is an example of information indicating the presence of an error correcting person, that is, information indicating that an operation for correcting the error is being performed. Note that the notification message G may be transmitted to each of the terminal apparatus 30B, the terminal apparatus 30C, and the like through the communication unit 26 to be displayed on each of the terminal apparatus 30B, the terminal apparatus 30C, and the like.

FIG. 10 illustrates an example of a notification message screen according to this exemplary embodiment.

As illustrated in FIG. 10, the notification message G has such a content that indicates the presence of an error correcting person. That is, the content of the notification message G indicates that an operation for correcting the error is being performed. Note that since the user name or the like of the user who has logged in to the image forming apparatus 10 is specified, a notification message such as "Mr. xx is correcting the error" may be displayed on each terminal apparatus 30.

According to this exemplary embodiment, at least the user of the terminal apparatus 30A is notified of an operation for correcting the error being performed. Accordingly, multiple persons are prevented from going to correct the error.

Second Exemplary Embodiment

The first exemplary embodiment has described a case where different error messages are displayed on the image forming apparatus 10 and on the terminal apparatus 30 if an error occurs during an image forming process. In contrast, a second exemplary embodiment will describe a case where different error messages are displayed on the multiple terminal apparatuses 30 if an error occurs during an image forming process. Note that the image forming apparatus 10 according to the second exemplary embodiment has substantially the same configuration as the image forming apparatus 10 according to the first exemplary embodiment, and description thereof will be omitted here.

As illustrated in FIG. 1 above, the image forming apparatus 10 according to the second exemplary embodiment includes the control unit 12 that performs the following process. That is, if an error occurs during an image forming process, the control unit 12 according to this exemplary embodiment performs control in such a manner that different error messages are transmitted to the terminal apparatuses 30A and 30B through the communication unit 26 so that the different error messages are displayed on the terminal apparatuses 30A and 30B. This control is performed on the basis of the communication statuses with the terminal apparatuses 30A and 30B and the statuses of operations performed by the users of the terminal apparatuses 30A and 30B. The error message transmitted to the terminal apparatus 30A is different from the error message transmitted to the terminal apparatus 30B. This function of the control unit 12 is realized by the CPU 12A writing the error notification program 14A, which is stored in the storing unit 14, in the RAM 12C and executing the error notification program 14A.

For example, the different error messages include the error message A (see FIG. 4) that encourages correction of the error and the error message B (see FIG. 5) that indicates the occurrence of the error. If, on the basis of the above operation statuses, it is determined that an instruction for performing an image forming process during which the error has occurred has been issued from the terminal apparatus 30A, the control unit 12 performs control in such a manner that the error message A is transmitted to the terminal apparatus 30A through the communication unit 26 so that the error message A is displayed on the terminal apparatus 30A. In this case, the error message B is displayed on the terminal apparatus 30B from which the instruction for performing the image forming process has not been issued. In addition, if, on the basis of the above operation statuses, it is determined that the instruction for performing the image forming process during which the error has occurred has been issued from the terminal apparatus 30B, the control unit 12 performs control in such a manner that the error message A is transmitted to the terminal apparatus 30B so that the error message A is displayed on the terminal apparatus 30B. In this case, the error message B is displayed on the terminal apparatus 30A from which the instruction for performing the image forming process has not been issued.

In the second exemplary embodiment too, if an error correcting person has been detected, the notification message G (see FIG. 10) that indicates the presence of an error correcting person may be transmitted to each of the terminal apparatus 30A and the terminal apparatus 30B as in the first exemplary embodiment.

According to the second exemplary embodiment, if an error occurs during an image forming process, appropriate error messages in accordance with the users of the terminal apparatus 30A and the terminal apparatus 30B are displayed.

Note that although an embodiment of displaying an error message has been described in most of the above description, an embodiment of presenting an error message by using voice, an embodiment of presenting an error message by lighting a lamp, or the like may be employed in addition to displaying the error message. In addition, an embodiment of presenting an error message by vibration may be employed in the case of the terminal apparatus 30.

An image forming apparatus has been described above as an example in the above exemplary embodiments. Each of the above exemplary embodiments may be implemented as a program for causing a computer to execute the function of each unit included in the image forming apparatus. Alternatively, each of the above exemplary embodiments may be implemented as a computer readable storage medium having the program stored therein.

In addition, the configuration of the image forming apparatus described above in the exemplary embodiments is an example and may be modified depending on the status without departing from the spirit of the present invention.

The process flows of the programs described above in the exemplary embodiments are also examples, and accordingly, an unnecessary step may be skipped, a new step may be added, and the order of steps may be changed without departing from the spirit of the present invention.

Furthermore, the above exemplary embodiments have described a case where the processes according to the exemplary embodiments are realized by a software configuration by using a computer executing a program. Each of the exemplary embodiments, however, is not limited to this case and may be realized by, for example, a hardware configuration or a combination of a hardware configuration and a software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a display on which information is displayed;
a communication interface that performs communication with a first display apparatus, which is an external apparatus; and
at least one processor programmed to:
determine whether or not the image forming apparatus or the first display apparatus is an apparatus from which an instruction has been issued for performing an image forming process during which an error has occurred;
display, on the apparatus that is determined to be the apparatus from which the instruction for performing the image forming process has not been issued, first error information that indicates occurrence of the error; and
display, on the apparatus that is determined to be the apparatus from which the instruction for performing the image forming process has been issued, second error information that encourages correction of the error,
wherein the communication interface further performs communication with a second display apparatus that is an external apparatus different from the first display apparatus, and
wherein, if, on the basis of a status of an operation performed by a user of the second display apparatus, it is determined that the instruction for performing the image forming process during which the error has occurred has not been issued from the second display apparatus, the at least one processor is further programmed to transmit third error information, which is different from the second error information, to the second display apparatus through the communication interface to display the third error information on the second display apparatus.

2. The image forming apparatus according to claim 1, wherein, if it is necessary to replace consumables in order to correct the error, the second error information includes information that encourages replacement of the consumables.

3. The image forming apparatus according to claim 1, wherein the at least one processor is further programmed to:
detects a person in the periphery of the image forming apparatus; and
if the second error information is transmitted to the first display apparatus and the detection unit has detected the person, perform control to display the first error information on the display.

4. The image forming apparatus according to claim 1, wherein the at least one processor is further programmed to:
if an operation for correcting the error is being performed, perform control to transmit information to the first display apparatus through the communication interface to display the information on the first display apparatus, the information indicating that the operation for correcting the error is being performed.

5. The image forming apparatus according to claim 1, wherein the third error information is banner information that indicates occurrence of the error.

6. The image forming apparatus according to claim 1, wherein, if an operation for issuing an instruction for performing an image forming process has been performed on the second display apparatus in the state where the third error information is displayed on the second display apparatus, the at least one processor is further programmed to perform control to transmit the second error information to the second display apparatus through the communication interface to display the second error information on the second display apparatus.

7. The image forming apparatus according to claim 1, wherein, if an operation screen that is irrelevant to the image forming process is being displayed on the second display apparatus, the at least one processor is further programmed to perform control to cancel the transmission of the third error information to the second display apparatus.

8. The image forming apparatus according to claim 1, wherein, during displaying of the second error information on the first display apparatus, if the second error information is hidden from being displayed, the at least one processor is further programmed to perform control to transmit the second error information to the second display apparatus through the communication interface to display the second error information on the second display apparatus.

9. The image forming apparatus according to claim 1, wherein, if it is not possible to perform communication with the first display apparatus through the communication interface, the at least one processor is further programmed to transmit an email to the first display apparatus as a notification of occurrence of the error.

10. The image forming apparatus according to claim claim 1, wherein the at least one processor is further programmed to:
determine whether the error is correctable by an average user of the image forming apparatus; and
when the error is not correctable by the average user of the image forming apparatus, perform control to display either: (i) a notification including the first error information that indicates occurrence of the error to the apparatus that is determined to be the apparatus from which the instruction for performing the image forming process has not been issued; or (ii) the second error information that encourages correction of the error on the apparatus that is determined to be the apparatus from which the instruction for performing the image forming process has not been issued.

11. An image forming method comprising:
displaying information on an image forming apparatus;
performing communication with a first display apparatus, which is an external apparatus;
determining whether or not the image forming apparatus or the first display apparatus is an apparatus from which an instruction has been issued for performing an image forming process during which an error has occurred;
displaying, on the apparatus that is determined to be the apparatus from which the instruction for performing the image forming process has not been issued, first error information that indicates occurrence of the error;
displaying, on the apparatus that is determined to be the apparatus from which the instruction for performing the image forming process has been issued, second error information that encourages correction of the error;

performing communication with a second display apparatus that is an external apparatus different from the first display apparatus; and if, on the basis of a status of an operation performed by a user of the second display apparatus, it is determined that the instruction for performing the image forming process during which the error has occurred has not been issued from the second display apparatus, transmitting third error information, which is different from the second error information, to the second display apparatus to display the third error information on the second display apparatus.

12. A non-transitory computer readable medium storing a program causing a computer to execute a process for image formation, the process comprising:

determining whether or not the image forming apparatus or the first display apparatus is an apparatus from which an instruction has been issued for performing an image forming process during which an error has occurred;

displaying, on the apparatus that is determined to be the apparatus from which the instruction for performing the image forming process has not been issued, first error information that indicates occurrence of the error; and displaying, on the apparatus that is determined to be the apparatus from which the instruction for performing the image forming process has been issued, second error information that encourages correction of the error;

performing communication with a second display apparatus that is an external apparatus different from the first display apparatus; and if, on the basis of a status of an operation performed by a user of the second display apparatus, it is determined that the instruction for performing the image forming process during which the error has occurred has not been issued from the second display apparatus, transmitting third error information, which is different from the second error information, to the second display apparatus to display the third error information on the second display apparatus.

* * * * *